(12) United States Patent
Clark

(10) Patent No.: US 8,402,385 B1
(45) Date of Patent: *Mar. 19, 2013

(54) SNAP TO CONTENT IN DISPLAY

(75) Inventor: Cary R. Clark, Chapel Hill, NC (US)

(73) Assignee: Google Inc., Mountain View, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 13/069,974

(22) Filed: Mar. 23, 2011

Related U.S. Application Data

(63) Continuation of application No. 11/938,694, filed on Nov. 12, 2007, now Pat. No. 7,934,166.

(51) Int. Cl.
*G06F 3/048* (2006.01)

(52) U.S. Cl. .......................... 715/784; 715/788

(58) Field of Classification Search .................. 715/764, 715/765, 784, 788
See application file for complete search history.

(56) References Cited

U.S. PATENT DOCUMENTS

| 6,072,461 A | 6/2000 | Haran |
| 6,825,860 B1 | 11/2004 | Hu et al. |
| 2008/0174570 A1 | 7/2008 | Jobs et al. |

*Primary Examiner* — Xiomar L Bautista
(74) *Attorney, Agent, or Firm* — Fish & Richardson P.C.

(57) ABSTRACT

The present disclosure provides methods and systems for managing viewable content on a display. In some implementations, the method includes displaying content on the display, monitoring scrolling activity of a user and selectively centering a portion of the content on the display based on the scrolling activity.

21 Claims, 7 Drawing Sheets

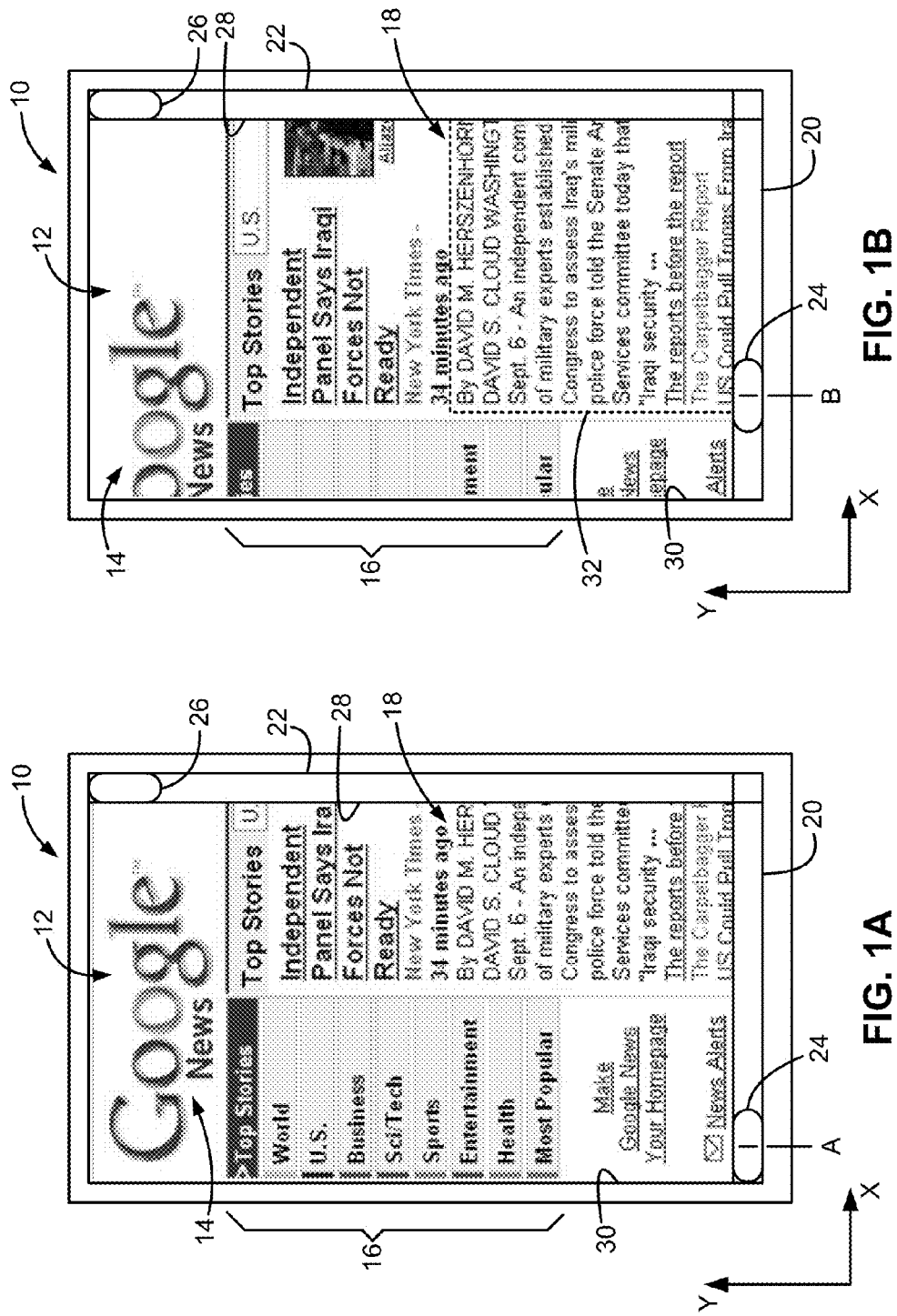

SNAP TO CONTENT IN DISPLAY

CROSS-REFERENCE TO RELATED APPLICATIONS

This application is a continuation of U.S. application Ser. No. 11/938,694, filed on Nov. 12, 2007, the disclosure of which is expressly incorporated herein by reference in its entirety.

TECHNICAL FIELD

This disclosure relates to methods and systems for managing content viewable in a display, and more particularly to snapping to content in a display.

BACKGROUND

As the quantity of available information on computer networks has increased, and as users have become accustomed to accessing this information through fixed computing devices (such as a desktop personal computer permanently connected to an appropriately provisioned network) and laptop computing devices (having either a wired or wireless connection to a network), users have demanded access to the same information through their mobile devices. Specifically, users now expect to be able to access stock quotes, baseball scores, restaurant listings and the like, including accurate network search results, from their mobile devices.

Mobile devices typically include a graphical user interface (GUI) such as a display. The display enables a user to visually interact with the mobile device, and to read information from the mobile device. For example, the user can navigate Internet websites and can view information, in the form of website content, on the display. In another example, a user can open a document including, but not limited to, a Microsoft (MS) Word document and/or an Adobe Acrobat document (pdf). The content that is accessible using the mobile device can include various forms. Text, figures, diagrams, pictures and the like are examples of visual website content.

As mobile devices become more popular, manufacturers endeavor to reduce the size of the mobile devices. As the size of the mobile devices decreases, the display size can also be reduced. Consequently, the amount of content that is viewable on the display at one time is correspondingly reduced.

SUMMARY

This document discloses methods, techniques, and systems for managing content that is viewable in a display. In some implementations, the methods include displaying content on the display, monitoring scrolling activity of a user and selectively centering a portion of the content on the display based on the scrolling activity.

In other aspects, some implementations can further include scanning the content and determining whether the portion of content includes margins that would be concurrently viewable if the portion of content were to be centered. The step of selectively centering occurs if the margins of the portion of content would be concurrently viewable. The step of selectively centering does not occur if the margins of the portion of the content would not be concurrently viewable. In another aspect, the portion of content can include a paragraph and the margins can include left and right margins of the paragraph.

In other aspects, some implementations can include determining whether the user scrolls the content from a first position to a second position and determining whether the user scrolls the content from the second position back to the first position. The step of selectively centering occurs if the user scrolls the content from the second position back to the first position. The first position can be separated from the second position by a single scroll step.

In still another aspect, the content can include at least one of text, figures, diagrams and images.

In yet another aspect, the content is provided on the display as a web page.

The details of one or more implementations are set forth in the accompanying drawings and the description below. Other features, objects, and advantages will be apparent from the description and drawings, and from the claims.

DESCRIPTION OF DRAWINGS

FIG. 1A is an exemplary representation of a display that is displaying exemplary content.

FIG. 1B is an exemplary representation of the display of FIG. 1A displaying a first portion of exemplary content.

Like reference symbols in the various drawings indicate like elements.

DETAILED DESCRIPTION

Figure 1D:
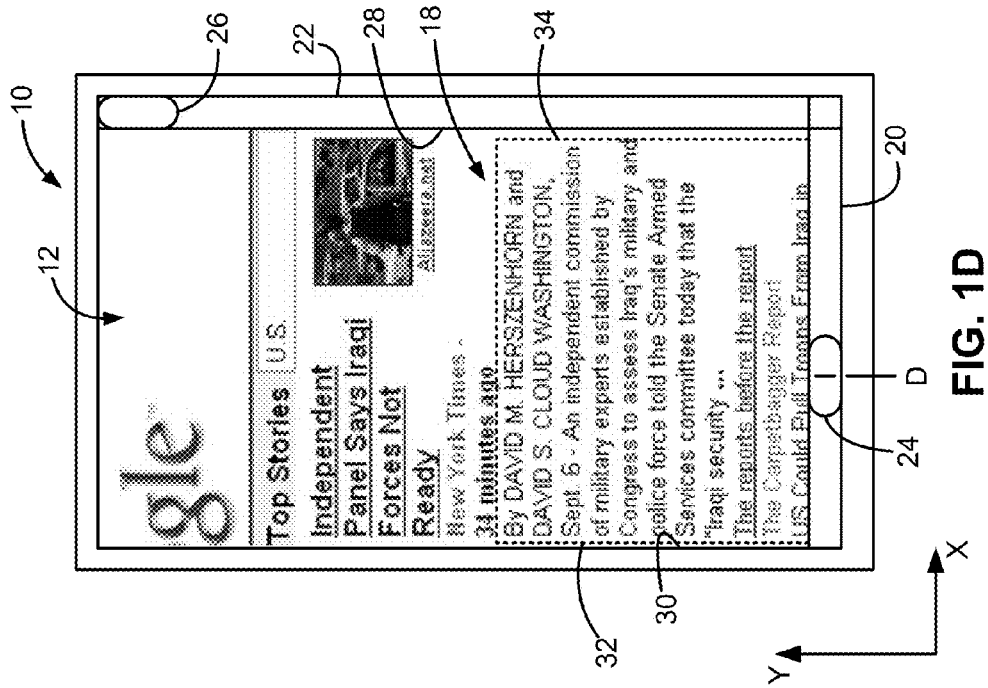
FIG. 1D is an exemplary representation of the display of FIG. 1A displaying exemplary content that is centered on the display.

The present disclosure is directed to various implementations of methods and systems for managing viewable content on a display. More specifically, various implementations of centering or snapping content on a display are described. Such implementations enable a user to more easily view content on the display, improving the users interaction with the display. Although the methods and systems are described with reference to the display of a mobile device, it is appreciated that these methods and systems can apply to any type of display, mobile or otherwise.

Referring now to FIGS. 1A-1D, an exemplary display 10 is illustrated. The display 10 displays a web page 12 of viewable content including, but not limited to, text and pictures. The exemplary content of FIGS. 1A-1D includes content from an exemplary news website provided by Google®. The content is provided as both text and pictures in the form of hypertext markup language (HTML), for example. HTML is a predominant markup language for websites and enables the structure of text-based information in a document to be described by denoting certain text as headings, paragraphs, and the like. HTML can supplement the text with interactive forms, embedded images, and other objects. HTML can also describe the appearance of the website and can include embedded scripting language code which can affect the behavior of web browsers and other HTML processors.

Only a portion of the news web page 12 illustrated in FIGS. 1A-1D is viewable in the display 10 at any one time. The viewable portion that is illustrated includes title text 14, a topic column 16 and a portion of an article summary or paragraph 18. In the exemplary illustration, the topic "Top Stories" is selected and a portion of a summary paragraph of one of the top stories is viewable. A user may select another topic, such as "U.S.", "Business", "Sci/Tech", "Sports", "Entertainment", "Health", or "Most Popular", for example. It is appreciated that the topics described herein are merely exemplary topics.

In order to view content that is off of the display 10, the user must scroll the web page 12 on the display 10. A horizontal scrollbar 20 and a vertical scrollbar 22 are provided, which enable the user to scroll the web page 12 on the display 10. The horizontal scrollbar 20 includes a tab 24 that is movable in the horizontal direction X to reveal additional content. The vertical scrollbar 22 includes a tab 26 that is movable in the vertical direction Y to reveal additional content. The tabs 24, 26 can initially be provided in a home position. FIG. 1A illustrates an exemplary home position where the tab 24 is in the left-most position, indicated as position A, and the tab 26 is in the upper-most position, as viewed in FIG. 1A. In the exemplary home position of FIG. 1A, the upper left corner of the web page 12 is the starting point for scrolling of the web page 12 in either the horizontal direction X or vertical direction Y.

As the user scrolls in the horizontal direction X and/or vertical direction Y, previously non-viewable content is revealed and previously viewable content is scrolled from view. For example, the content of FIGS. 1A-1D includes the paragraph 18, only a portion of which is initially viewable. As the user scrolls the web page 12, the tab 24 moves from the home or first position A (FIG. 1A) to a second position B (FIG. 1B). The web page 12 scrolls to the right by a predetermined amount. This predetermined amount can be referred to as a scroll resolution. The scroll resolution can be a predefined amount that is provided by the particular web page browser or program, which is used to display the content. For example, the scroll resolution can be predefined as Z pixels per scroll position change. As a result, when the web page is scrolled and the tab 24 moves from position A to position B, Z pixels of previously non-viewable content are moved into view on the right-hand edge 28 of the display 10 and Z pixels of previously viewable content are moved out of view on the left-hand edge 30 of the display 10, as viewed in FIGS. 1A and 1B. A scroll from position A to position B is a single-step scroll. In some implementations, the scroll resolution for the horizontal direction X and the vertical direction Y can be equivalent. In other implementations, the scroll resolution for the horizontal direction X and vertical direction Y can be different.

Figure 1C:
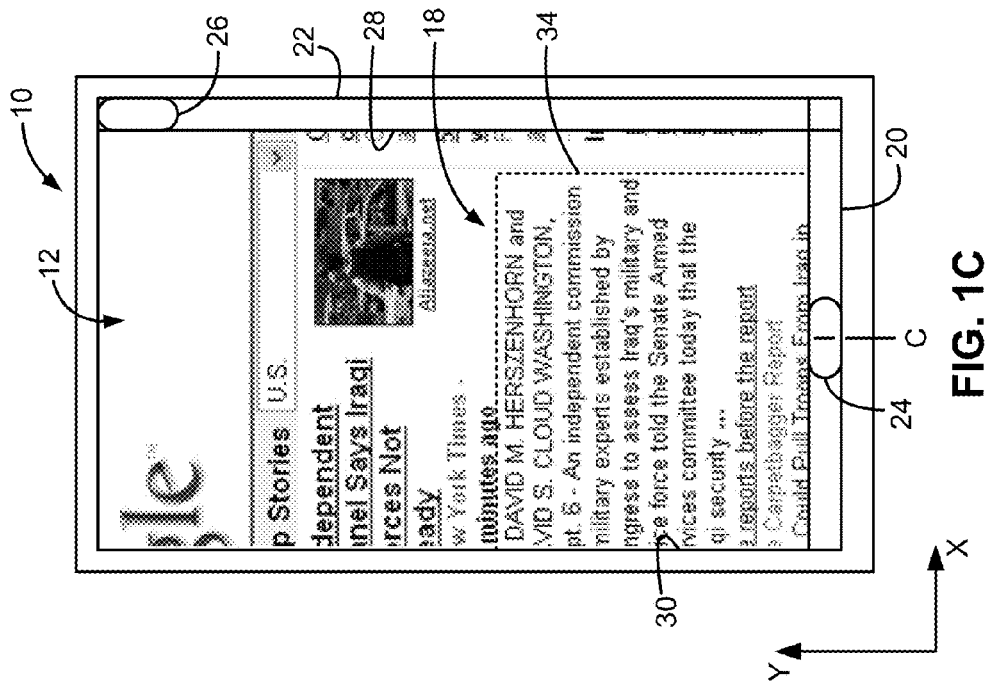
FIG. 1C is an exemplary representation of the display of FIG. 1A displaying a second portion of exemplary content.

With particular reference to FIGS. 1B and 1C, the content of the paragraph 18, beginning at a left-hand margin 32 thereof, is initially viewable when the tab 24 is in position B (see FIG. 1B). If the web page 12 is again scrolled to the right, the content of the paragraph 18, ending at a right-hand margin 34, becomes viewable when the tab 24 is in position C (see FIG. 1C). A scroll from position B to position C is a single-step scroll, whereas a scroll from position A to position C is a multi-step scroll. The previously viewable content, towards the left-hand margin 32, is scrolled from view. Because the scroll resolution is too great, the entire paragraph 18 between the left-hand and right-hand margins 32, 34 is not viewable at any one time. To read the content of the paragraph 18, the user would traditionally scroll the web page 12 back and forth, where the tab 24 moves back and forth between positions B and C.

The viewable content manager of the present disclosure monitors the scrolling activity of a user and determines whether the user is repeatedly scrolling back and forth to view content. If the user is repeatedly scrolling and there is content, the left-to-right margins of which could be viewed on the display 10, that content is centered on the display 10. Using the exemplary web page 12 of FIGS. 1B and 1C, a user may scroll back and forth to view the left-hand and right-hand margins of the paragraph 18 as the user reads the paragraph 18. The viewable content manager, monitors the scrolling activity of the user and recognizes that the user is scrolling between positions B and C, or close approximations of positions B and C, of the tab 24. The viewable content manager scans the content and can determine that the user is reading the paragraph 18. This determination can be based on the fact that the paragraph 18 may be the only content, the left-hand and the right-hand margins 32, 34 of which, are intermittently viewable as the tab 24 moves from position B to position C.

With reference to FIG. 1D, the viewable content manager centers the paragraph 18 on the display 10, if it determines that the entire paragraph 18 between the left-hand and right-hand margins 32, 34 can fit within the display 10. As a result, the tab 24 is located in position D, which is between positions B and C. The user is then able to read the entire paragraph 18 from the left-hand margin 32 to the right-hand margin 34 without having to scroll back and forth. The user can scroll downward, moving the tab 26, to further read the paragraph 18. Once the user has read the paragraph 18, or otherwise decides to further navigate the web page 12, the user can scroll the web page 12 as desired. If, however, there is no content that could be centered, scrolling of the web page 12 operates as normal.

Figure 2:
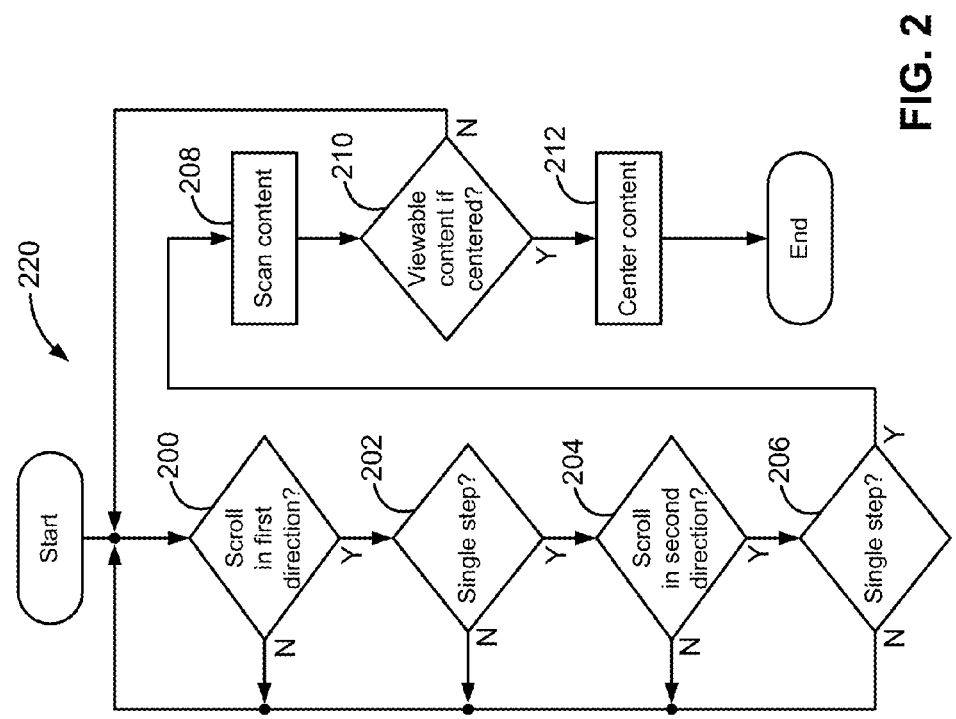
FIG. 2 is a flowchart illustrating an exemplary process executed by an implementation of a viewable content manager described herein.

FIG. 2 is a flowchart of an exemplary process 220 that may be executed by the viewable content manager of the present disclosure. At 200, it is determined whether the user scrolls the display in a first direction. If the user does not scroll the display in the first direction, the exemplary process loops back. If the user scrolls the display in the first direction, it is determined whether the scroll is single step scroll at 202. If the scroll is not a single step scroll, the process loops back to 200. If the scroll is a single step scroll, it is determined whether the user scrolls the display in a second direction, opposite to the first, at step 204. If the user does not scroll the display in the second direction, the process loops back to 200. At 206, it is determined whether the scroll in the second direction is a single step scroll. If the scroll is not a single step scroll, the process loops back to 200. If the scroll is a single step scroll, the process continues at 208.

As a note, single step scrolls are monitored as an indication that the user is viewing specific content. For example, multi-step scrolls can indicate that the user is scrolling through the content without focusing on or reading specific portions of the content. Additionally, multi-step scrolls can indicate that a specific portion of the content that the user is reading can not be centered. For example, if the user must scroll more than once to reach the left-hand margin of a paragraph he is reading, that paragraph can not be centered in the display.

At 208, the web page 12 and it's content that is partially viewable on the display is scanned. At 210, it is determined whether there is partially viewable content having left-hand and right-hand margins that would be completely viewable if centered. If there is no content on the web page 12 that would be completely viewable if centered, the process loops back to

200. If there is content that would be completely viewable if centered, that content is centered at 212.

Other implementations of processes that may be executed by the viewable content manager are also contemplated. For example, a counter can count the number of times the user scrolls back and forth in the first and second directions, e.g., between positions B and C of the tab 24. If the count exceeds a threshold value, the scanning and centering steps of process 220 are executed. In this manner, the content is not centered until the user has scrolled back and forth a threshold number of times.

The various implementations of a viewable content manager described above are exemplary in nature. Such implementations are not limited to viewing a web page, for example. Such implementations are equally applicable to viewing any type of content on a display. For example, the viewable content manager can be used with documents from a word processor including, but not limited to, Word®, WordPerfect® and Open Office®, as well as with documents form a spreadsheet program including, but not limited to, Excel®, Lotus 1-2-3®, Borland Quattro®, Open Office Calc®, or portable document format (PDF) documents from Adobe®. In short, the viewable content manager can be implemented with any content that is viewable on a display, regardless of the particular program that provides the content or format of the content.

It is also contemplated that the viewable content manager can be modified to accommodate a written format that is particular to the language of the content, for example. More specifically, text can be written in any language. Some languages including, but not limited to, English, French, Spanish and German, are read from left-to-right, top-to-bottom. The exemplary implementation of the viewable content manager discussed with reference to FIGS. 1A-1D, is described using a language that is read from left-to-right, top-to-bottom. Other languages can be read differently. Some languages, including, but not limited to, Hebrew and Arabic, are read from right-to-left, top-to-bottom. Still other languages, including, but not limited to, Chinese, are read from top-to-bottom, right-to-left. In the case of a language that is read from top-to-bottom, right-to-left, the viewable content manager can center content, the top margin and bottom margin of which fit within the viewable area of the display.

Figure 3:
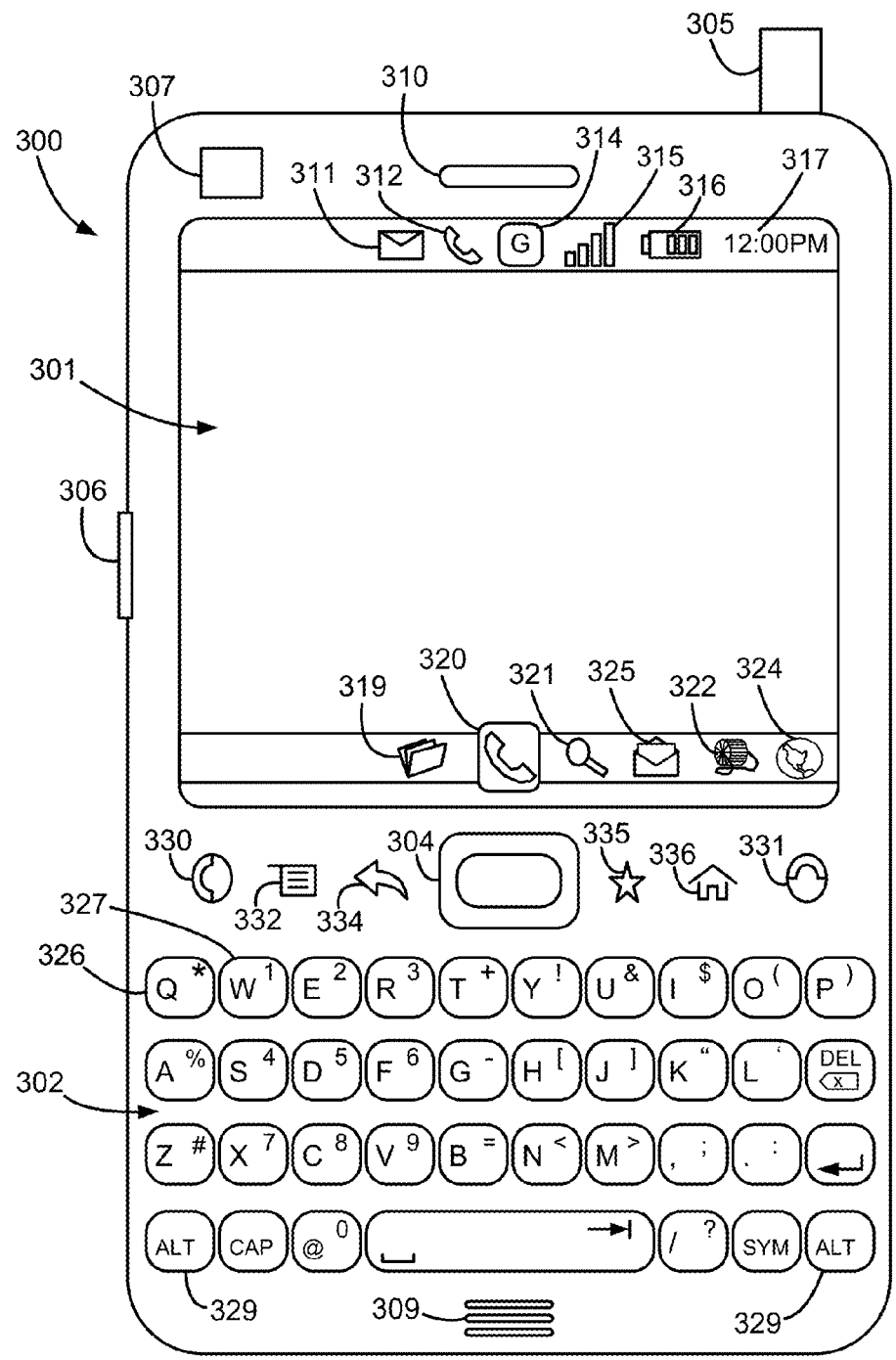
FIG. 3 is a schematic representation of a mobile device that implements the viewable content manager described herein.

Those skilled in the art recognize that the viewable content manager of the present disclosure can be implemented in any device that displays content on a display. The viewable content manager, however, provides particular advantages in displays of reduced size, such as the display of a mobile device. Referring now to FIG. 3, the exterior appearance of an exemplary mobile device 300 that implements the viewable content manager is illustrated. Briefly, and among other things, the device 300 includes a processor configured to generate content on the mobile device, to recognize when the user is repeatedly scrolling to view particular content, and to center the content if the reading margins of the content can be concurrently viewed.

In more detail, the hardware environment of the device 300 includes a display 301 for displaying content (e.g., text, images, and video) to the user; a keyboard 302 for entering text data and user commands into the device 300; a pointing device 304 for pointing, selecting, and adjusting objects displayed on the display 301; an antenna 305; a network connection 306; a camera 307; a microphone 309; and a speaker 310. Although the device 300 includes an external antenna, it is contemplated that the device 300 can include an internal antenna, which is not visible to the user.

The display 301 displays video, graphics, images, and text that make up the user interface for the software applications used by the device 300, and the operating system programs used to operate the device 300. Among the possible elements that may be displayed on the display 301 are a new mail indicator 311 that alerts a user to the presence of a new message; an active call indicator 312 that indicates that a telephone call is being received, placed, or is occurring; a data standard indicator 314 that indicates the data standard currently being used by the device 300 to transmit and receive data; a signal strength indicator 315 that indicates a measurement of the strength of a signal received by via the antenna 305, such as by using signal strength bars; a battery life indicator 316 that indicates a measurement of the remaining battery life; or a clock 317 that presents the current time.

The display 301 may also show application icons representing various applications available to the user, such as a web browser application icon 319, a phone application icon 320, a search application icon 321, a contacts application icon 322, a mapping application icon 324, an email application icon 325, or other application icons. In one example implementation, the display 301 is a quarter video graphics array (QVGA) thin film transistor (TFT) liquid crystal display (LCD), capable of 16-bit or better color.

A user uses the keyboard (or "keypad") 302 to enter commands and data to operate and control the operating system and applications that provide for automatic cropping of an image. The keyboard 302 includes standard keyboard buttons or keys associated with alphanumeric characters, such as keys 326 and 327 that are associated with the alphanumeric characters "Q" and "W" when selected alone, or are associated with the characters "*" and "1", respectively, when pressed in combination with key 329, for example. A single key may also be associated with special characters or functions, including unlabeled functions, based upon the state of the operating system or applications invoked by the operating system. For example, when an application calls for the input of a numeric character, a selection of the key 327 alone may cause a "1" to be input.

In addition to keys traditionally associated with an alphanumeric keypad, the keyboard 302 also includes other special function keys, such as an establish call key 330 that causes a received call to be answered or a new call to be originated; a terminate call key 331 that causes the termination of an active call; a drop down menu key 332 that causes a menu to appear within the display 301; a backwards navigation key 334 that causes a previously accessed network address to be accessed again; a favorites key 335 that causes an active web page to be placed in a bookmarks folder of favorite sites, or causes a bookmarks folder to appear; a home page key 336 that causes an application invoked on the device 300 to navigate to a predetermined network address; or other keys that provide for multiple-way navigation, application selection, and power and volume control.

The user uses the pointing device 304 to select and adjust graphics and text objects displayed on the display 301 as part of the interaction with and control of the device 300 and the applications invoked on the device 300. The pointing device 304 is any appropriate type of pointing device, and may be a joystick, a trackball, a touch-pad, a camera, a voice input device, a touch screen device implemented in combination with the display 301, or any other input device.

The antenna 305, which can be an external antenna or an internal antenna, is a directional or omni-directional antenna used for the transmission and reception of radiofrequency (RF) signals that implement point-to-point radio communication, wireless local area network (LAN) communication, or location determination. The antenna 305 may facilitate point-to-point radio communication using the Specialized Mobile Radio (SMR), cellular, or Personal Communication Service (PCS) frequency bands, and may implement the transmission of data using any number or data standards. For example, the antenna 305 may allow data to be transmitted between the device 300 and a base station using technologies such as Wireless Broadband (WiBro), Worldwide Interoperability for Microwave ACCess (WiMAX), 3GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only) (EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access 3000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM® MSM7200A chipset with an QUALCOMM® RTR6285™ transceiver and PM7540™ power management circuit.

The wireless or wireline computer network connection 306 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 306 may connect to a LAN network, a corporate or government WAN network, the Internet, a telephone network, or other network. The network connection 306 uses a wireline or wireless connector. Example wireless connectors include, for example, an INFRARED DATA ASSOCIATION® (IrDA®) wireless connector, a Wi-Fi wireless connector, an optical wireless connector, an INSTITUTE OF ELECTRICAL AND ELECTRONICS ENGINEERS® (IEEE®) Standard 802.11 wireless connector, a BLUETOOTH® wireless connector (such as a BLUETOOTH® version 1.2 or 3.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wireline connectors include, for example, a IEEE®-1394 FIREWIRE® connector, a Universal Serial Bus (USB) connector (including a mini-B USB interface connector), a serial port connector, a parallel port connector, or other wireline connector. In another implementation, the functions of the network connection 306 and the antenna 305 are integrated into a single component.

The camera 307 allows the device 300 to capture digital images, and may be a scanner, a digital still camera, a digital video camera, other digital input device. In one example implementation, the camera 307 is a 3 mega-pixel (MP) camera that utilizes a complementary metal-oxide semiconductor (CMOS). The camera may also be associated with software to perform various functions on captured images, such as identification of certain portions of an image to permit for cropping of those portions from the image.

The microphone 309 allows the device 300 to capture sound, and may be an omni-directional microphone, a unidirectional microphone, a bi-directional microphone, a shotgun microphone, or other type apparatus that converts sound to an electrical signal. The microphone 309 may be used to capture sound generated by a user, for example when the user is speaking to another user during a telephone call via the device 300. Conversely, the speaker 310 allows the device to convert an electrical signal into sound, such a voice from another user generated by a telephone application program, or a ring tone generated from a ring tone application program. Furthermore, although the device 300 is illustrated in FIG. 3 as a handheld device, in further implementations the device 300 may be a laptop, a workstation, a midrange computer, a mainframe, an embedded system, telephone, desktop PC, a tablet computer, a PDA, or other type of computing device.

Figure 4:
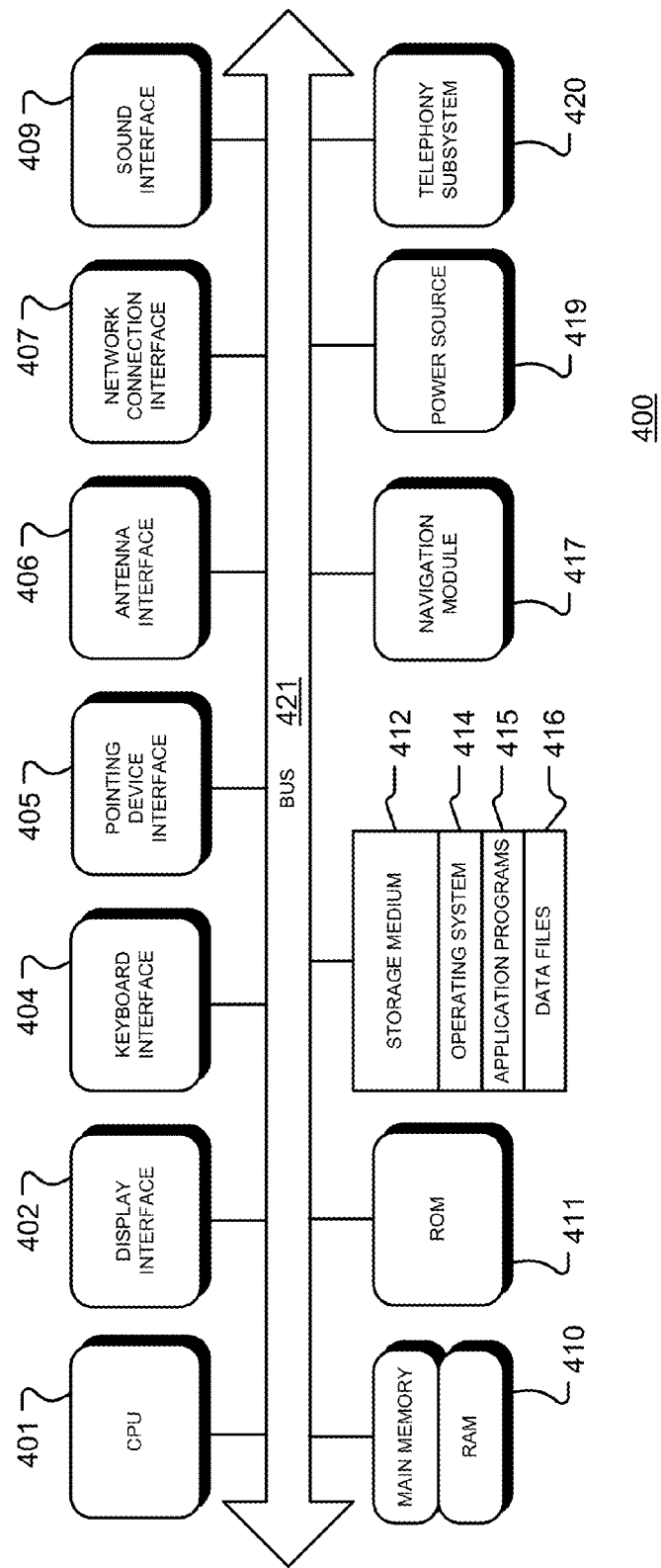
FIG. 4 is a block diagram illustrating an exemplary internal architecture of the mobile device of FIG. 3.

FIG. 4 is a block diagram illustrating an internal architecture 400 of the device 300. The architecture includes a central processing unit (CPU) 401 where the computer instructions that comprise an operating system or an application are processed; a display interface 402 that provides a communication interface and processing functions for rendering video, graphics, images, and texts on the display 301, provides a set of built-in controls (such as buttons, text and lists), and supports diverse screen sizes; a keyboard interface 404 that provides a communication interface to the keyboard 302; a pointing device interface 405 that provides a communication interface to the pointing device 304; an antenna interface 406 that provides a communication interface to the antenna 305; a network connection interface 407 that provides a communication interface to a network over the computer network connection 306; a camera interface (not shown) that provides a communication interface and processing functions for capturing digital images from the camera 307; a sound interface 409 that provides a communication interface for converting sound into electrical signals using the microphone 309 and for converting electrical signals into sound using the speaker 310; a random access memory (RAM) 410 where computer instructions and data are stored in a volatile memory device for processing by the CPU 401; a read-only memory (ROM) 411 where invariant low-level systems code or data for basic system functions such as basic input and output (I/O), startup, or reception of keystrokes from the keyboard 302 are stored in a non-volatile memory device; a storage medium 412 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 414, application programs 415 (including, for example, a web browser application, a widget or gadget engine, and or other applications, as necessary) and data files 419 are stored; a navigation module 417 that provides a real-world or relative position or geographic location of the device 300; a power source 419 that provides an appropriate alternating current (AC) or direct current (DC) to power components; and a telephony subsystem 420 that allows the device 300 to transmit and receive sound over a telephone network. The constituent devices and the CPU 401 communicate with each other over a bus 421.

The CPU 401 is one of a number of computer processors. In one arrangement, the computer CPU 401 is more than one processing unit. The RAM 410 interfaces with the computer bus 421 so as to provide quick RAM storage to the CPU 401 during the execution of software programs such as the operating system application programs, and device drivers. More specifically, the CPU 401 loads computer-executable process steps from the storage medium 412 or other media into a field of the RAM 410 in order to execute software programs. Data is stored in the RAM 410, where the data is accessed by the computer CPU 401 during execution. In one example configuration, the device 300 includes at least 128 MB of RAM, and 256 MB of flash memory.

The storage medium 412 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300, or to upload data onto the device 300.

A computer program product is tangibly embodied in storage medium 412, a machine-readable storage medium. The computer program product includes instructions that, when read by a machine, operate to cause a data processing apparatus to store image data in the mobile device. In some implementations, the computer program product includes instructions that generate content on the display 301, that recognize when the user is repeatedly scrolling to view particular content, and that center the content if the reading margins of the content can be concurrently viewed.

The operating system 414 may be a LINUX®-based operating system such as the GOOGLE® ANDROID® operating system; APPLE® MAC OS X®; MICROSOFT® WINDOWS NT®/WINDOWS® 2000/WINDOWS® XP/WINDOWS MOBILE; a variety of UNIX®-flavored operating systems; or a proprietary operating system for computers or embedded systems. The application development platform or framework for the operating system 414 may be: BINARY RUNTIME ENVIRONMENT FOR WIRELESS® (BREW®); JAVA® Platform, Micro Edition (JAVA® ME) or JAVA® 2 Platform, Micro Edition (J2ME®) using the SUN MICROSYSTEMS® JAVASCRIPT® programming language; PYTHON™, FLASH LITE®, or MICROSOFT® .NET Compact, or another appropriate environment.

The device stores computer-executable code for the operating system 414, and the application programs 415 such as an email, instant messaging, a video service application, a mapping application word processing, spreadsheet, presentation, gaming, mapping, web browsing, JAVASCRIPT® engine, or other applications. For example, one implementation may allow a user to access the GOOGLE® GMAIL® email application, the GOOGLE® TALK® instant messaging application, a YOUTUBE® video service application, a GOOGLE® MAPS® or GOOGLE® EARTH® mapping application, or a GOOGLE® PICASA® imaging editing and presentation application. The application programs 415 may also include a widget or gadget engine, such as a TAFRI™ widget engine, a MICROSOFT® gadget engine such as the WINDOWS SIDEBAR® gadget engine or the KAPSULES™ gadget engine, a YAHOO! ® widget engine such as the KONFABULTOR™ widget engine, the APPLE® DASHBOARD® widget engine, the GOOGLE® gadget engine, the KLIPFOLIO® widget engine, an OPERA™ widget engine, the WIDSETS™ widget engine, a proprietary widget or gadget engine, or other widget or gadget engine the provides host system software for a physically-inspired applet on a desktop.

Although it is possible to provide for automatic cropping of an image using the above-described implementation, it is also possible to implement the functions according to the present disclosure as a dynamic link library (DLL), or as a plug-in to other application programs such as an Internet web-browser such ® ® as the FOXFIRE web browser, the APPLE® SAFARI® web browser or the MICROSOFT® INTERNET EXPLORER® web browser.

The navigation module 417 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 417 may also be used to measure angular displacement, orientation, or velocity of the device 300, such as by using one or more accelerometers.

Figure 5:
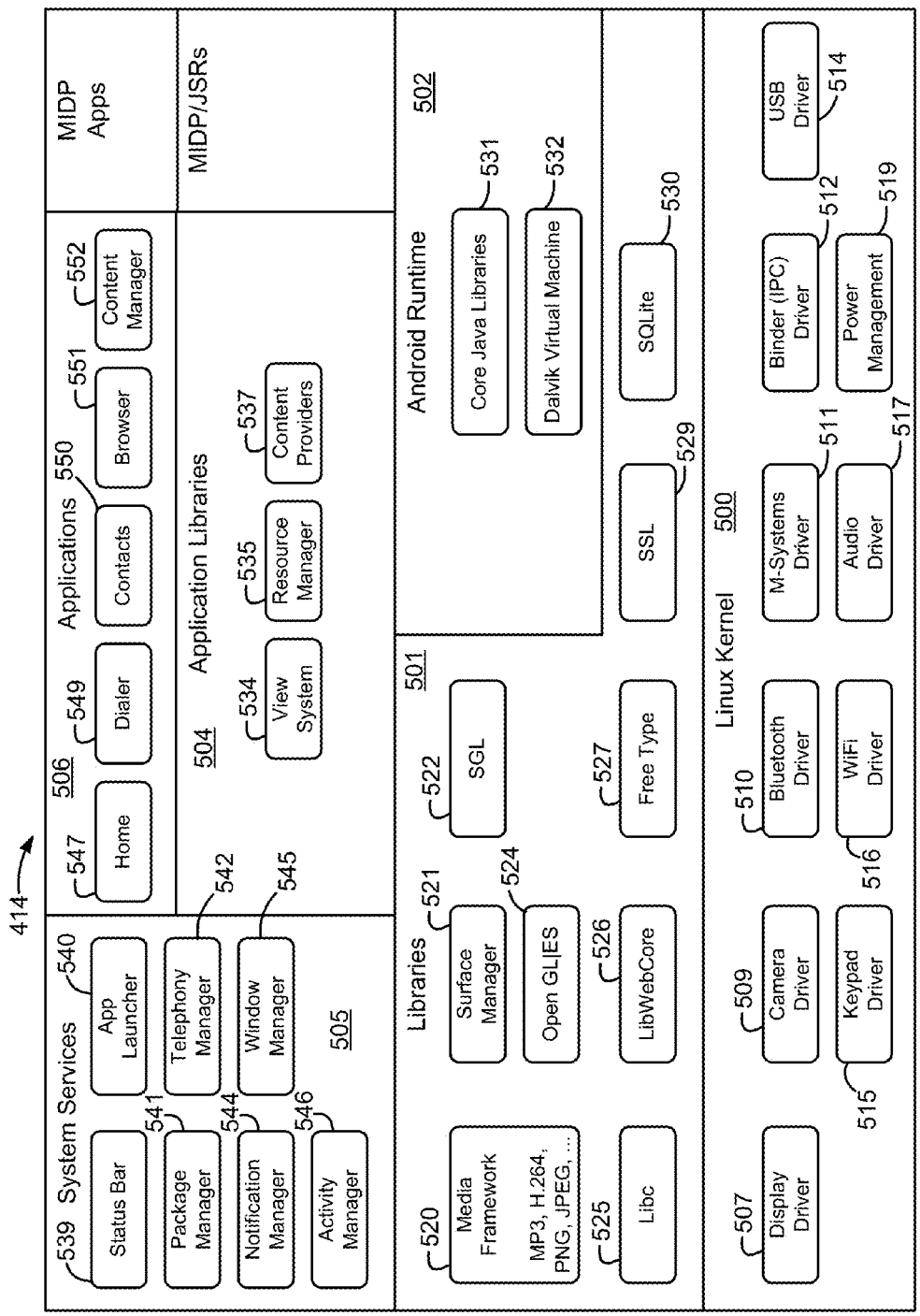
FIG. 5 is a block diagram illustrating components of an exemplary operating system used by the device of FIG. 3.

FIG. 5 is a block diagram illustrating exemplary components of the operating system 414 used by the device 300, in the case where the operating system 414 is the GOOGLE® ANDROID® operating system. The operating system 414 invokes multiple processes, while ensuring that the associated phone application is responsive, and that wayward applications do not cause a fault (or "crash") of the operating system. Using task switching, the operating system 414 allows for the switching of applications while on a telephone call, without losing the state of each associated application. The operating system 414 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 414 can generally be organized into six components: a kernel 500, libraries 501, an operating system runtime 502, application libraries 504, system services 505, and applications 506. The kernel 500 includes a display driver 507 that allows software such as the operating system 414 and the application programs 415 to interact with the display 301 via the display interface 402, a camera driver 509 that allows the software to interact with the camera 307; a BLUETOOTH® driver 510; an M-Systems driver 511; a binder (IPC) driver 512; a USB driver 514; a keypad driver 515 that allows the software to interact with the keyboard 302 via the keyboard interface 404; a WiFi driver 516; audio drivers 517 that allow the software to interact with the microphone 309 and the speaker 310 via the sound interface 409; and a power management component 519 that allows the software to interact with and manage the power source 419.

The BLUETOOTH® driver 510, which in one implementation is based on the BlueZ BLUETOOTH® stack for LINUX®-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH® driver provides JAVA® bindings for scanning, pairing and unpairing, and service queries.

The libraries 501 include a media framework 520 that supports standard video, audio and still-frame formats (such as Moving Picture Experts Group (MPEG)-4, H.264, MPEG-1 Audio Layer 5 (MP3), Advanced Audio Coding (AAC), Adaptive Multi-Rate (AMR), Joing Photographic Experts Group (JPEG), and others) using an efficient JAVA® Application Programming Interface (API) layer; a surface manager 521; a simple graphics library (SGL) 522 for two-dimensional application drawing; an Open Graphics Library for Embedded Systems (OpenGL ES) 524 for gaming and three-dimensional rendering; a C standard library (LIBC) 525; a LIBWEBCORE library 526; a FreeType library 527; an SSL 529; and an SQLite library 530.

The operating system runtime 502, which generally makes up a Mobile Information Device Profile (MIDP) runtime, includes core JAVA libraries 531, and a Dalvik virtual machine 532. The Dalvik virtual machine 532 is a custom virtual machine that runs a customized file format (.DEX) as well as unmodified files including, but not limited to, JAVA files (.CLASS/.JAR). With regard to graphics rendering, a system-wide composer manages surfaces and a frame buffer and handles window transitions, using the OpenGL ES 524 and two-dimensional hardware accelerators for its compositions.

The Dalvik virtual machine 532 may be used with an embedded environment, since it uses runtime memory very efficiently, implements a CPU-optimized bytecode interpreter, and supports multiple virtual machine processes per device. The custom file format (.DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated bytecodes are designed for quick interpretation, since register-based instead of stack-based instructions reduce memory and dispatch overhead, since fixed width instructions simplifies parsing, and since the 16-bit code units minimize reads.

The application libraries 504, which generally make up the MIDP JAVA® Specification Requests (JSRs), includes a view system 534, a resource manager 535, and content providers 537. The system services 505 includes a status bar 539; an application launcher 540; a package manager 541 that maintains information for all installed applications; a telephony manager 542 that provides an application level JAVA® interface to the telephony subsystem 420; a notification manager 544 that allows all applications access to the status bar and on-screen notifications; a window manager 545 that allows multiple applications with multiple windows to share the display 301; and an activity manager 546 that runs each application in a separate process, manages an application life cycle, and maintains a cross-application history.

The applications 506, which generally make up the MIDP applications, include a home application 547, a dialer application 549, a contacts application 550, a browser application 551, and a content manager 552.

The telephony manager 542 provides event notifications (such as phone state, network state, Subscriber Identity Module (SIM) status, or voicemail status), allows access to state information (such as network information, SIM information, or voicemail presence), initiates calls, and queries and controls the call state. The browser application 551 renders web pages in a full, desktop-like manager, including navigation functions. Furthermore, the browser application 551 allows single column, small screen rendering, and provides for the embedding of HTML views into other applications.

Figure 6:
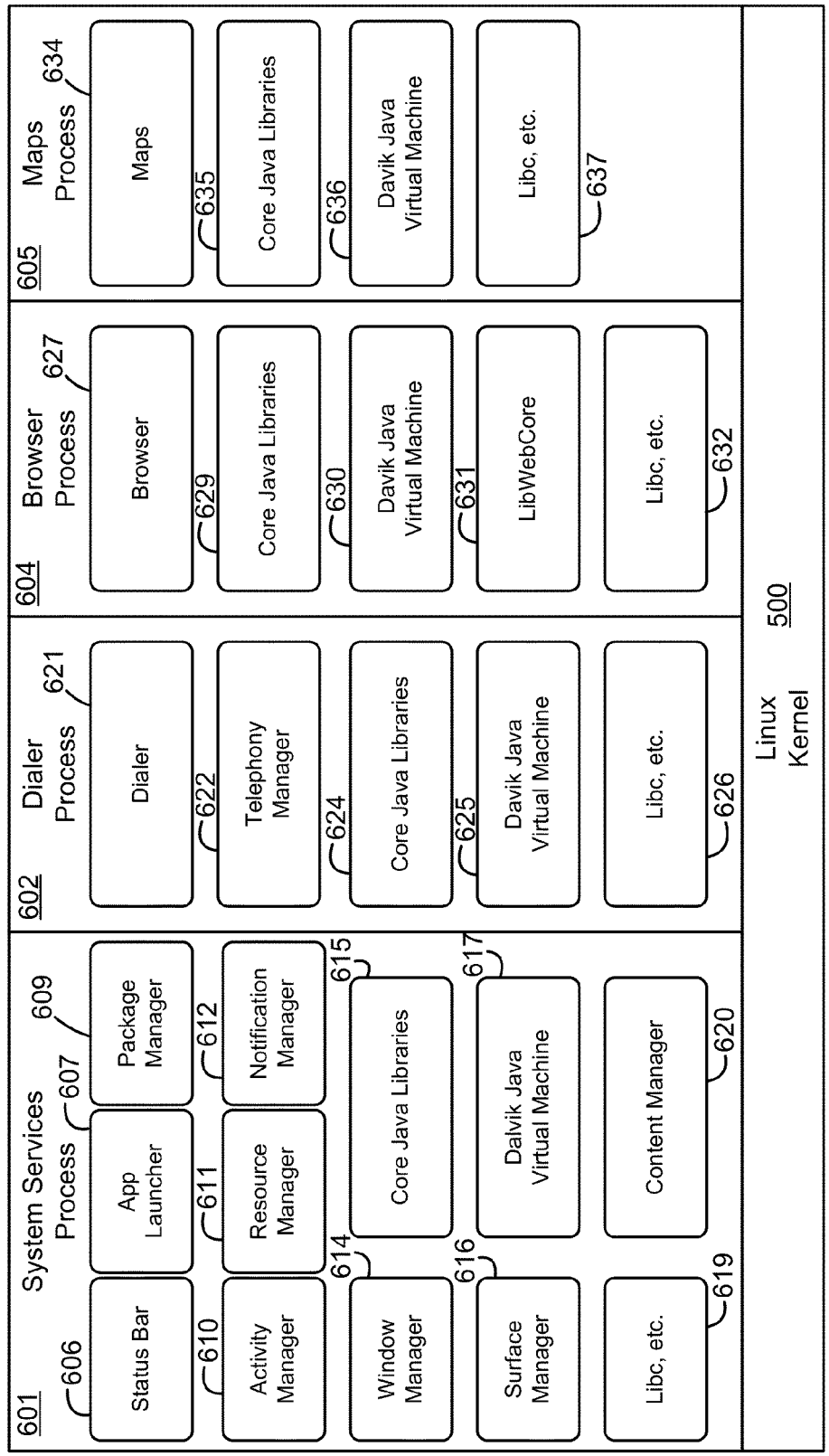
FIG. 6 is a block diagram illustrating processes implemented by the exemplary operating system of FIG. 5.

FIG. 6 is a block diagram illustrating exemplary processes implemented by the operating system kernel 500. Generally, applications and system services run in separate processes, where the activity manager 546 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

The persistent core system services, such as the surface manager 616, the window manager 614, or the activity manager 610, are hosted by system processes, although application processes, such processes associated with the dialer application 621, may also be persistent. The processes implemented by the operating system kernel 500 may generally be categorized as system services processes 601, dialer processes 602, browser processes 604, and maps processes 605. The system services processes 601 include status bar processes 606 associated with the status bar 539; application launcher processes 607 associated with the application launcher 540; package manager processes 609 associated with the package manager 541; activity manager processes 610 associated with the activity manager 546; resource manager processes 611 associated with a resource manager that provides access to graphics, localized strings, and XML layout descriptions; notification manger processes 612 associated with the notification manager 544; window manager processes 614 associated with the window manager 545; core JAVA® libraries processes 615 associated with the core JAVA® libraries 531; surface manager processes 616 associated with the surface manager 521; Dalvik virtual machine processes 617 associated with the Dalvik virtual machine 532, LIBC processes 619 associated with the LIBC library 525; and content manager processes 620 associated with the content manager application 552.

The dialer processes 602 include dialer application processes 621 associated with the dialer application 549; telephony manager processes 622 associated with the telephony manager 542; core JAVA® libraries processes 624 associated with the core JAVA® libraries 531; Dalvik virtual machine processes 625 associated with the Dalvik virtual machine 532; and LIBC processes 626 associated with the LIBC library 525. The browser processes 604 include browser application processes 627 associated with the browser application 551; core JAVA® libraries processes 629 associated with the core JAVA® libraries 531; Dalvik virtual machine processes 630 associated with the Dalvik virtual machine 532; LIBWEBCORE processes 631 associated with the LIBWEBCORE library 526; and LIBC processes 632 associated with the LIBC library 525.

The maps processes 605 include maps application processes 634, core JAVA® libraries processes 635, Dalvik virtual machine processes 636, and LIBC processes 637. Notably, some processes, such as the Dalvik virtual machine processes, may exist within one or more of the systems services processes 601, the dialer processes 602, the browser processes 604, and the maps processes 605.

While FIGS. 3 to 6 illustrate one possible implementation of a computing system that executes program code, or program or process steps, configured to effectuate viewable content management, other types of devices and operating systems may also be used as well.

A number of implementations of the viewable content manager have been described. Nevertheless, it will be understood that various modifications may be made without departing from the spirit and scope of the disclosure. Accordingly, other implementations are within the scope of the following claims.

What is claimed is:

1. A method, comprising:
   outputting, by a computing device, content for display;
   monitoring, by the computing device, scrolling activity of a user of the computing device, the scrolling activity including a number of times the user provides input to scroll the content between a first position and a second position; and
   outputting for display, in response to the number of times exceeding a threshold value, and based on the scrolling activity, a selectively centered portion of the content.

2. The method of claim 1, wherein the step of outputting does not occur when margins of the portion of the content are not concurrently viewable.

3. The method of claim 1, wherein the portion of the content includes a paragraph and margins, the margins including left and right margins of the paragraph.

4. The method of claim 1, wherein the step of monitoring further comprises:
   determining whether the user scrolls the content from the first position to the second position; and
   determining whether the user scrolls the content from the second position back to the first position,
   wherein the step of outputting further includes outputting for display the selectively centered portion in response to determining that the user scrolls the content from the second position back to the first position.

5. The method of claim 4, wherein the first position is separated from the second position by a single scroll step.

6. The method of claim 1, wherein the content includes at least one of text, figures, diagrams and images.

7. The method of claim 1, wherein the content is provided on the display as a web page.

8. A system, comprising:
   means for outputting content for display;
   means for monitoring scrolling activity of a user, the scrolling activity including a number of times the user provides input to scroll the content between a first position and a second position; and
   means for outputting for display, in response to the number of times exceeding a threshold value, and based on the scrolling activity, a selectively centered portion of the content.

9. The system of claim 8, wherein the portion of content is not selectively centered when margins of the portion of the content are not concurrently viewable.

10. The system of claim 8, wherein the portion of the content includes a paragraph and margins, the margins including left and right margins of the paragraph.

11. The system of claim 8, further comprising:
    means for determining whether the user scrolls the content from the first position to the second position; and
    means for determining whether the user scrolls the content from the second position back to the first position,
    wherein the portion of content is selectively centered when the user scrolls the content from the second position back to the first position.

12. The system of claim 11, wherein the first position is separated from the second position by a single scroll step.

13. The system of claim 8, wherein the content includes at least one of text, figures, diagrams and images.

14. The system of claim 8, wherein the content is provided on the display as a web page.

15. A mobile device, comprising:
    a display that displays content;
    memory that stores a viewable content manager application; and
    a processor that executes the viewable content manager application to monitor scrolling activity, the scrolling activity including a number of times the user provides input to scroll the content between a first position and a second position,
    wherein the displayed content includes, in response to the number of times exceeding a threshold value, and based on the scrolling activity, a selectively centered portion of the content.

16. The mobile device of claim 15, wherein the portion of content is not centered when margins of the portion of the content are not be concurrently viewable.

17. The mobile device of claim 15, wherein the portion of the content includes a paragraph and margins, the margins including left and right margins of the paragraph.

18. The mobile device of claim 15, wherein the scrolling activity is monitored by determining whether the user scrolls the content back and forth between a first position and a second position.

19. The mobile device of claim 18, wherein the first position is separated from the second position by a single scroll step.

20. The mobile device of claim 15, wherein the content includes at least one of text, figures, diagrams and images.

21. The mobile device of claim 15, wherein the content is provided on the display as a web page.

\* \* \* \* \*